United States Patent
Harden et al.

(10) Patent No.: US 9,919,556 B1
(45) Date of Patent: Mar. 20, 2018

(54) AUXILIARY VEHICLE TIRE DEPLOYMENT SYSTEM

(71) Applicants: Cleo Harden, Mount Vernon, AL (US); Gerald Barnes, Mount Vernon, AL (US)

(72) Inventors: Cleo Harden, Mount Vernon, AL (US); Gerald Barnes, Mount Vernon, AL (US)

( * ) Notice: Subject to any disclaimer, the term of this patent is extended or adjusted under 35 U.S.C. 154(b) by 693 days.

(21) Appl. No.: 14/541,109

(22) Filed: Nov. 13, 2014

Related U.S. Application Data

(60) Provisional application No. 61/903,752, filed on Nov. 13, 2013.

(51) Int. Cl.
   - *B60B 19/00* (2006.01)
   - *B62D 61/12* (2006.01)
   - *G05D 3/00* (2006.01)

(52) U.S. Cl.
   CPC ............. *B60B 19/00* (2013.01); *B62D 61/12* (2013.01); *G05D 3/00* (2013.01); *B60B 2900/731* (2013.01)

(58) Field of Classification Search
   CPC ... B60B 19/00; B60B 2900/731; B62D 61/12; G05D 3/00
   USPC ......... 701/49, 31.9; 280/86.5, 735; 340/442, 340/445; 73/146.2
   See application file for complete search history.

(56) References Cited

U.S. PATENT DOCUMENTS

| | | | |
|---|---|---|---|
| 5,188,341 A | 2/1993 | Greaves | |
| 5,197,641 A | 3/1993 | Montgomery, Jr. | |
| 5,993,133 A * | 11/1999 | Murray | B62D 43/045 224/42.12 |
| 6,278,363 B1 * | 8/2001 | Bezek | B60C 23/0416 340/442 |
| 6,561,489 B1 | 5/2003 | Wakefield | |
| 2007/0039987 A1 | 2/2007 | Osenkowski | |
| 2007/0061100 A1 * | 3/2007 | Hall | B60C 23/062 702/140 |
| 2009/0015393 A1 * | 1/2009 | Mori | B60C 23/045 340/445 |
| 2010/0296901 A1 | 11/2010 | Muhammadi et al. | |

\* cited by examiner

*Primary Examiner* — Marthe Y Marc-Coleman
(74) *Attorney, Agent, or Firm* — Global Intellectual Property Agency, LLC; Jordan Sworen

(57) ABSTRACT

A system for compensating for a flat tire, including a tire deployment sub-system and a tire pressure monitoring subsystem. The tire deployment system comprises an extendable auxiliary tire mounted to the frame of the automobile that is in communication with the tire pressure monitoring system and a user interface. The tire pressure monitoring system is adapted to monitor the internal pressure of the tires of the vehicle, via either direct or indirect means, and send a notification signal to the tire deployment system when the pressure sensor detects that one of the tires of the vehicle is losing pressure. The deployed auxiliary tire provides a temporary support for the tire that has gone flat, allowing the driver to continue driving for a period of time and thereby obviating the need to immediately pull to the side of the road and change out the flat for a spare tire.

8 Claims, 3 Drawing Sheets

AUXILIARY VEHICLE TIRE DEPLOYMENT SYSTEM

CROSS REFERENCE TO RELATED APPLICATION

This application claims the benefit of U.S. Provisional Application No. 61/903,752 filed on Nov. 13, 2013. The above identified patent application is herein incorporated by reference in its entirety to provide continuity of disclosure.

BACKGROUND OF THE INVENTION

Field of the Invention

The present invention relates to an automobile flat tire automobile spare tire towing apparatuses. More specifically, the present invention relates to automobile spare tire systems that are adapted to automatically deploy stowed auxiliary tires when a flat is detected.

Description of the Prior Art

Devices have been disclosed in the prior art that relate to auxiliary tire holding or deployment systems for use when a tire goes flat or otherwise loses pressure. These include devices that have been patented and published in patent application publications. These devices generally relate to mechanical devices that are adapted to hold spare tires in a way that such tires can be deployed to replace or augment a low-pressure tire.

Various types of systems and devices for holding and/or deploying spare tires are known in the prior art. However, none of these devices or systems are adapted to automatically deploy auxiliary tires when a tire has gone flat and they therefore nonetheless force drivers to pull to the side of the road to deploy the auxiliary or spare tire. Pulling to the side of the road to change or deploy a tire can be dangerous, especially in low-light conditions or with roads that have narrow shoulders. Therefore, there is a need in the prior art for a device or system that is adapted to automatically deploy an auxiliary tire to compensate for a tire that has gone flat, obviating the need to immediately pull to the side of the road and change the flat tire.

The present invention provides a system that monitors for the occurrence of a flat tire, automatically deploys an auxiliary tire in response to the detected flat tire event, and notified the user as such. The present invention comprises a plurality of deployable auxiliary tires located adjacently to each of the vehicle's wheels, thereby allowing an auxiliary tire to properly compensate for the tire that has gone flat by deploying an auxiliary tire adjacently thereto. The present invention substantially diverges in design elements from the prior art and consequently it is clear that there is a need in the art for an improvement to existing devices and systems adapted to compensate for flat tires. In this regard the instant invention substantially fulfills these needs.

SUMMARY OF THE INVENTION

In view of the foregoing disadvantages inherent in the known types of auxiliary vehicle tire deployment systems now present in the prior art, the present invention provides a new auxiliary tire deployment system wherein the same can be utilized for providing convenience for the user in order to obviate the need to immediately pull to the side of the road to replace a flat tire.

It is therefore an object of the present invention to provide a new and improved auxiliary vehicle tire deployment system that has all of the advantages of the prior art and none of the disadvantages.

It is another object of the present invention to provide an auxiliary vehicle tire deployment system that automatically deploys an auxiliary tire to compensate for a flat tire when the system detects that the tire has gone flat.

Another object of the present invention is to provide an auxiliary vehicle tire deployment system that notifies the user of the occurrence of a flat tire event and as to which tire has gone flat.

Yet another object of the present invention is to provide an auxiliary vehicle tire deployment system that is adapted to deploy an auxiliary tire located adjacently to the vehicle's tire that has gone flat.

Yet another object of the present invention is to provide an auxiliary vehicle tire deployment system that is adapted for use with either direct tire pressure monitoring systems or indirect tire pressure monitoring systems.

Still yet another object of the present invention is to provide an auxiliary vehicle tire deployment system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
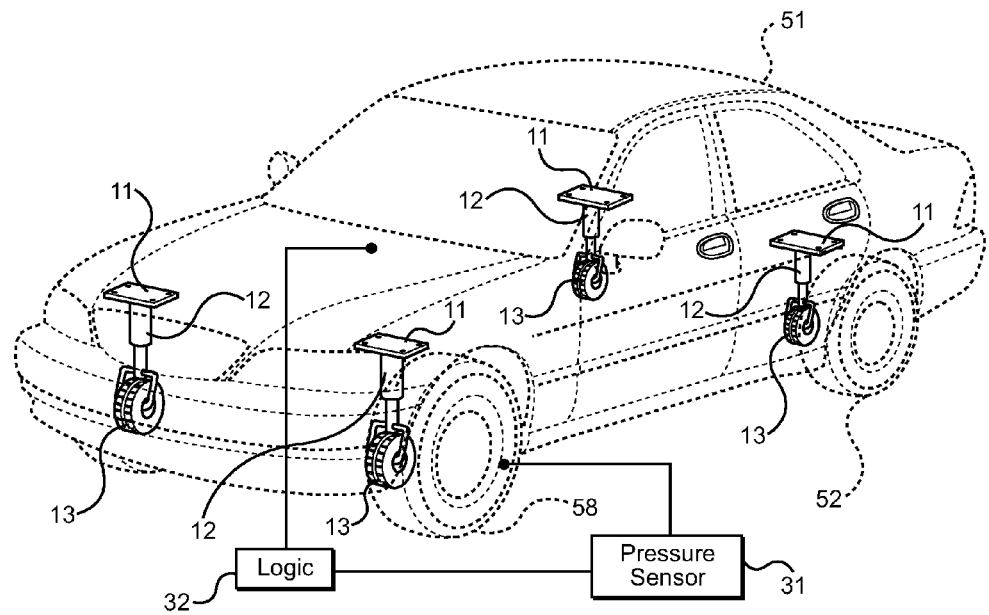
FIG. 1 shows a perspective cutaway view of an automobile with the present invention installed therein.

Reference is made herein to the attached drawings. Like reference numerals are used throughout the drawings to depict like or similar elements of the auxiliary vehicle tire deployment system. For the purposes of presenting a brief and clear description of the present invention, the preferred embodiment will be discussed as used for an automobile. The figures are intended for representative purposes only and should not be considered to be limiting in any respect.

As used herein, "logic" refers to (i) logic implemented as computer instructions and/or data within one or more computer processes and/or (ii) logic implemented in electronic circuitry. As used herein, "computer-readable medium" excludes any transitory signals, but includes any non-transitory data storage circuitry, e.g., buffers, cache, and queues, within transceivers of transitory signals.

Figure 2:
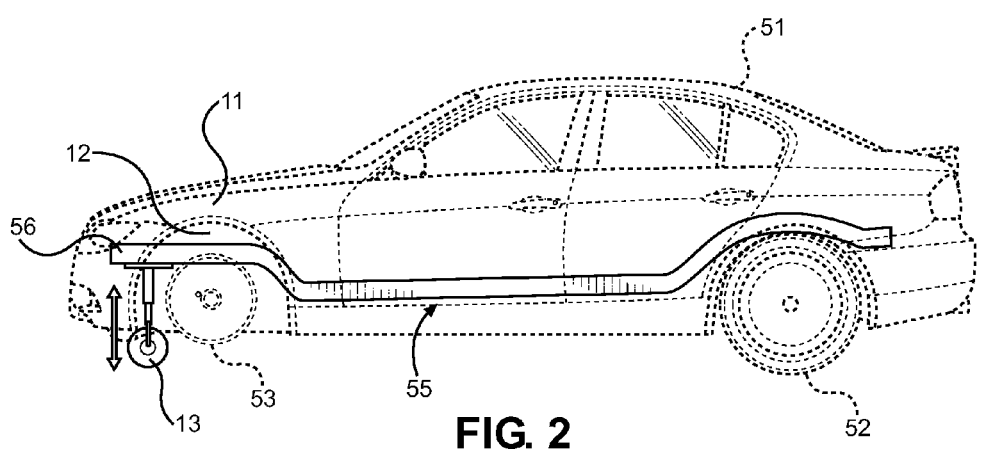
FIG. 2 shows a side elevational cutaway view the present invention installed onto the frame of an automobile.
Figure 3:
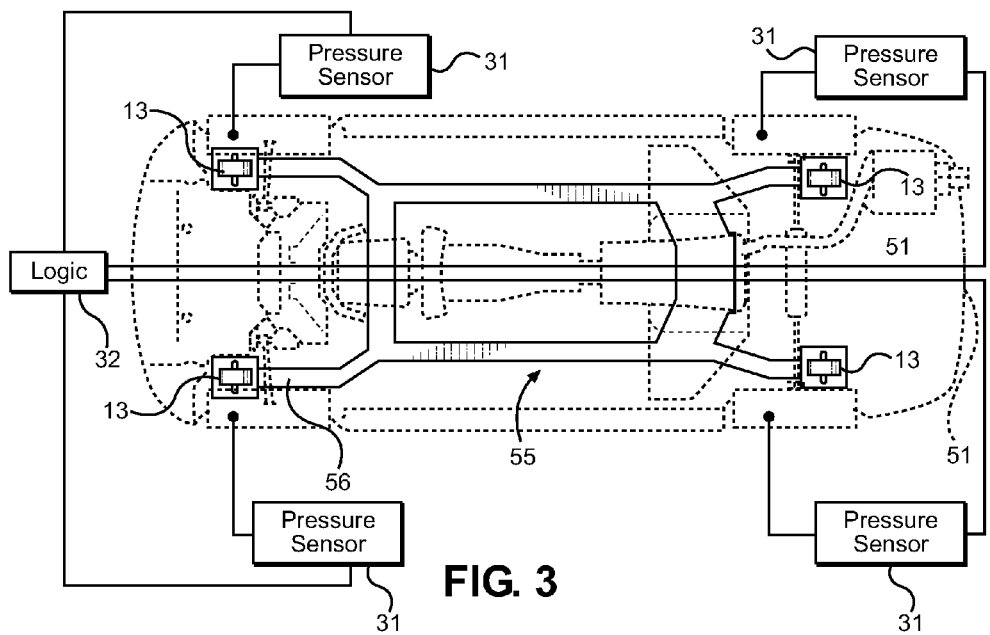
FIG. 3 shows a cutaway view of the underside the present invention installed onto the frame of an automobile.

Referring now to FIGS. 1-3, there are shown cutaway views of the present invention installed onto an automobile. The present system comprises two separate sub-systems: a tire deployment system and a tire pressure monitoring system. The tire deployment system comprises an extendable auxiliary tire mounted to the frame of the automobile 51 that is in electronic communication with the tire pressure monitoring system and, optionally, a user interface. The tire pressure monitoring system comprises a pressure sensor 31 that is adapted to monitor the internal pressure of the tires of the vehicle and a logic 32 that is adapted to send a notification signal to the tire deployment system when the pressure sensor 31 detects that one of the tires of the vehicle has gone flat or is otherwise losing pressure. The deployed auxiliary tire provides a temporary support for the tire that has gone flat, allowing the driver to continue driving for a period of time and thereby obviating the need to immediately pull to the side of the road and change out the flat tire for a spare tire.

The auxiliary tires comprise an extendable arm 12 having a first end and a second end, a mounting plate 11 disposed on the first end, and a tire 13 rotatably disposed on the second end. The mounting plate 11 is affixed to the frame 55 of the vehicle 51 or otherwise at any point along the chassis of the vehicle 51; however, no claim is made as to a specific attachment point. The present invention comprises multiple extendable arms 12 mounted adjacently to each of the wheels 52 of the vehicle 51 so that the auxiliary tires 13, when extended, can provide a temporary support for a vehicle's tire that has gone flat. In the embodiment of the present invention depicted in FIGS. 2 and 3, the arm 12 is affixed to the frame 55 at a position forward and generally interior from the wheel 52 so as to not interfere with the function of the wheel hub assembly 53, the axle, and the mechanical linkages situated therearound. The present invention may be retrofitted to an existing vehicle or incorporated into the integral design of a vehicle.

The arm 12 is adapted to transition between a stowed position in which the auxiliary tire 13 is not in contact with the road surface and an extended position in which the tire 13 is in contact with the road surface. As such, the length of the arm 12 is dependent upon the position on which it is mounted on the chassis, i.e. the ultimate length of the arm 12 will vary based upon the distance between the point at which the arm 12 is mounted and the ground. The extension mechanism of the arms 12 comprises a hydraulic actuator, a pneumatic actuator, an electro-mechanical actuator, or any other such device that is capable of mechanically extending or retracting the arms 12 such that the arms 12 can transition between a stowed position and an extended position.

The tire pressure monitoring system comprises a pressure sensor 31 and a logic 32 integral to the vehicle that is adapted to receive a notification signal from the pressure sensor 31, determine the source of the notification signal, and then deploy the appropriate auxiliary tire 13 corresponding to the location of the source of the signal. The tire pressure monitoring system comprises either a direct tire pressure monitoring system or an indirect tire pressure monitoring system. In embodiments of the present invention utilizing a direct tire pressure monitoring system, the pressure sensor 31 is mounted directly to the wheel or the tire of the vehicle and comprises a pressure transducer, mounted either externally or internally to the tire, and a transmitter. When the pressure transducer detects a drop in pressure in the tire, i.e. the tire has gone flat, then the transmitter transmits a notification signal to the logic 32 to notify the system of the occurrence. The transmitter comprises an RF transmitter, an electrical transmitter, or any other such signal transmitter known in the prior art. The transmitter also preferably transmits a unique ID, either embedded within the notification signal or as a separate transmission. The unique ID corresponds to the location of the source of the signal on the vehicle. For example, in an automobile having four wheels, each wheel would have a unique ID corresponding therewith that would allow the logic 32 to determine the source of the vehicle so that the logic 32 could then deploy the appropriate auxiliary tire 13.

In embodiments of the present invention utilizing an indirect tire pressure monitoring system, the pressure sensor 31 comprises a logic that is adapted to monitor the velocity of the rotation of the tire. The velocity of the rotation of the tire is determined by the integral electronic stability control system of the vehicle, the integral anti-lock brake system of the vehicle, or via a non-integral system adapted to monitor the velocity of the rotation of the wheels of the vehicle via any means known in the prior art. Under-inflated tires have a smaller diameter, and thus a larger angular velocity; therefore, a system utilizing a logic to constantly monitor the rotational velocity of each of the individual wheels can determine when there is an increase in said rotational velocity to detect drops in the internal air pressure of the tires. In this embodiment of the present invention, the logic-based pressure sensor 31 further comprises a transmitter to transmit a notification signal to the logic 32 when a pressure drop event has been detected by the pressure sensor 31.

Figure 4:
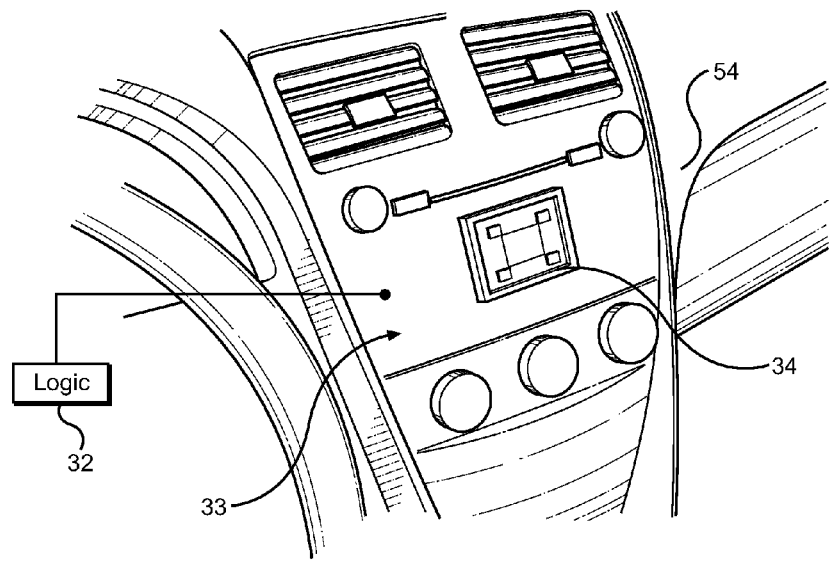
FIG. 4 shows a perspective view of the user interface of the present invention disposed on the dashboard of an automobile.

Referring now to FIG. 4, there is shown a perspective view of the user interface of the present invention disposed on the dashboard of an automobile. The present invention further comprises a user interface 33 disposed within the interior of the vehicle, such as on the dashboard 54. The user interface 33 comprises a screen 34 adapted to display the occurrence of a flat tire event to the user. The logic 32 of the present invention is in communication with the user interface 33 and activates said user interface 33 when it has received the notification signal from the tire pressure monitoring system.

In the depicted embodiment of the present invention, the screen 34 has four icons corresponding to the two front and two back tires of the automobile. When the notification has been received and the unique ID has been identified by the logic 32, the logic 32 activates the appropriate icon to indicate to the user that a flat tire has occurred and which tire has gone flat. In some embodiments of the present invention, the user must then manually actuate a button, actuate a portion of the screen 34 if the screen 34 is of a touch screen type, provide a voice command, or otherwise indicate that the logic 32 should activate the tire deployment system. The tire deployment system will not activate until that input is received from the user. In other embodiments of the present invention, the logic 32 automatically activates the tire deployment system when a notification signal is received and the user interface 33 simply provides a means to notify the user that the system has taken corrective action and that the indicated tire that has gone flat needs to be eventually replaced.

Figure 5:
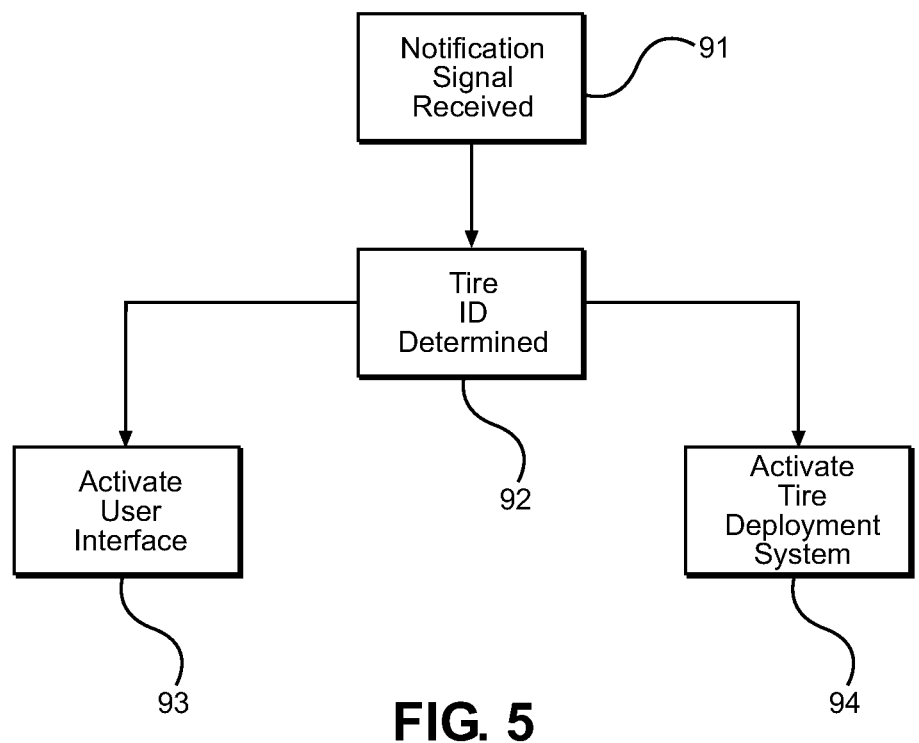
FIG. 5 shows a diagram of the function of an embodiment of the logic of the present invention.

Referring now to FIG. 5, there is shown a diagram of the function of an embodiment of the logic of the present invention. The depicted diagram of the logic 32 is for an embodiment in which the logic 32 automatically activates the tire deployment system when the tire pressure monitoring system has detected a flat tire event. In this embodiment, the logic 32 receives a notification signal 91 transmitted by the tire pressure monitoring system when said system has detected low pressure. This notification signal 91 is transmitted to the logic 32 regardless of whether the tire pressure monitoring system is a direct or indirect monitoring system. Once the notification signal 91 has been received, the logic 32 then determines the unique tire ID 92 identifying the source of the signal. In some embodiments of the present invention, the unique ID 92 is embedded within the notification signal 91 and decoded by the logic 32, whereas in other embodiments of the present invention, the unique ID 92 is a separate signal transmitted in close proximity to the notification signal 91. Once the notification signal 91 has been received, the logic 32 then automatically activates the tire deployment system 94 and activates the user interface 93 to indicate to the driver that a tire has gone flat, which tire has gone flat, and that the system is taking corrective action by deploying an auxiliary tire to compensate for the flat tire. The activation of the user interface 93 is dependent upon the unique ID 92 received by the logic 32. For example, in an exemplary embodiment of the present invention, the present invention is installed within a standard four-wheeled automobile and the user interface comprises four icons representing each of said wheels. When the notification signal and the unique ID have been received and identified 91, 92 by the logic 32, the logic 32 then causes the icon corresponding to the tire associated with the unique ID on the user interface to be activated 93.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An auxiliary vehicle tire deployment system, comprising:
   one or more extendable arms comprising an auxiliary tire rotatably mounted thereon;
   said one or more extendable arms adapted to be affixed to a frame of a vehicle;
   a tire pressure monitoring system comprising a pressure sensor and a transmitter;
   a logic stored within a vehicle computer system;
   wherein when said pressure sensor detects a flat tire, said transmitter relays an activation signal to said logic;
   wherein when said logic receives said activation signal, said logic causes said extendable arm to extend such that said auxiliary tire makes contact with a road surface.

2. The auxiliary vehicle tire deployment system of claim 1, wherein said activation signal comprise a unique ID corresponding to a location of each of said one or more extendable arms.

3. The auxiliary vehicle tire deployment system of claim 1, wherein said tire pressure monitoring system comprises a direct tire pressure monitoring system.

4. The auxiliary vehicle tire deployment system of claim 3, wherein said pressure sensor comprises a pressure transducer.

5. The auxiliary vehicle tire deployment system of claim 1, wherein said tire pressure monitoring system.

6. The auxiliary vehicle tire deployment system of claim 1, wherein each of said one or more extendable arms comprise a hydraulic extension mechanism.

7. The auxiliary vehicle tire deployment system of claim 1, wherein each of said one or more extendable arms comprise a pneumatic extension mechanism.

8. The auxiliary vehicle tire deployment system of claim 1, wherein said one or more extendable arms comprise a mounting plate, said mounting plate adapted to be affixed to a frame of said vehicle, adjacent to a wheel of said vehicle.

\* \* \* \* \*